Dec. 11, 1951     A. A. PETERSON     2,577,913
VARIABLE SPEED DRIVE AND CLUTCH
Filed May 13, 1949     2 SHEETS—SHEET 2
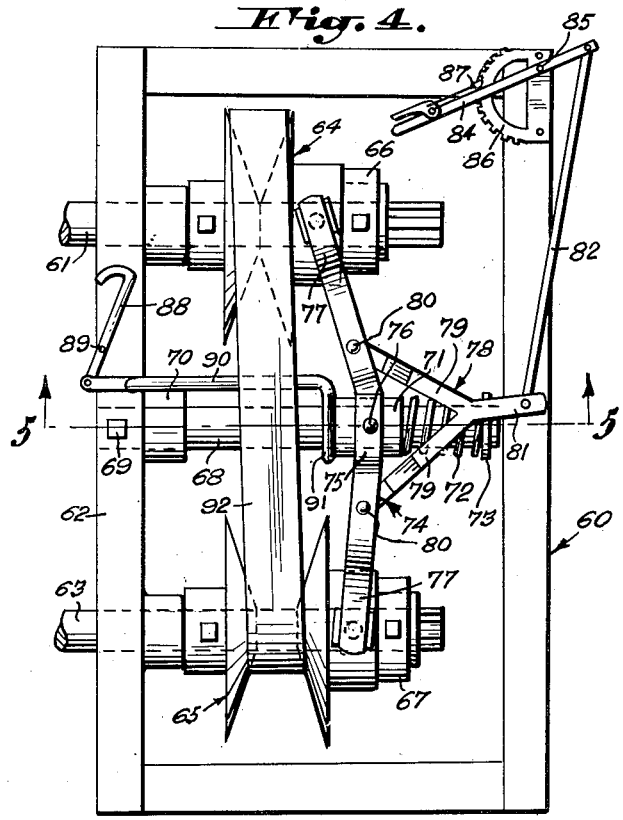
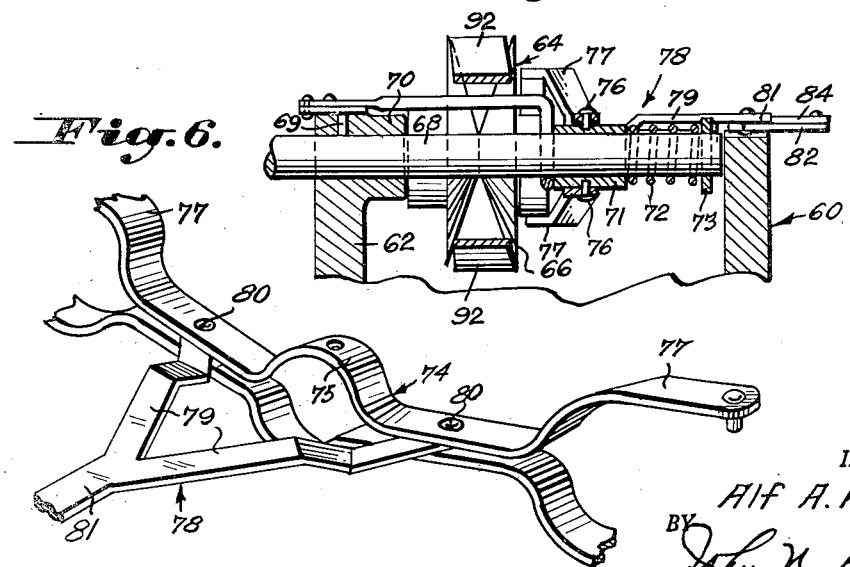
INVENTOR.
Alf A. Peterson
BY John N. Randolph Patented Dec. 11, 1951

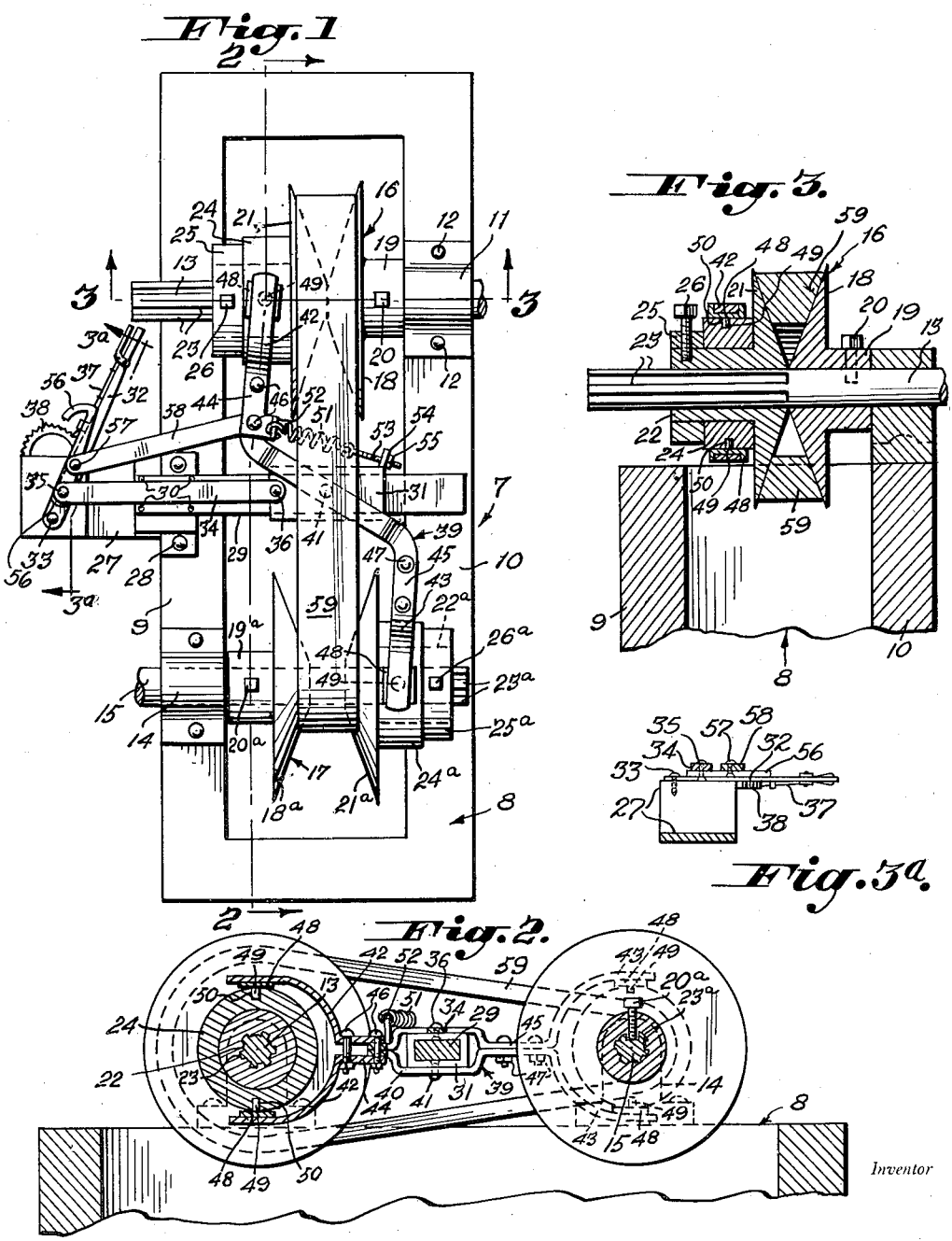

2,577,913

UNITED STATES PATENT OFFICE 2,577,913

VARIABLE-SPEED DRIVE AND CLUTCH

Alf A. Peterson, Hallock, Minn.

Application May 13, 1949, Serial No. 92,970

2 Claims. (Cl. 74—230.17)

This invention relates to a variable speed drive whereby a driven shaft may be driven through a belt connection by a drive shaft at different speeds and while the drive shaft is being revolved at a uniform speed.

More particularly, it is a primary object of the present invention to provide a variable speed drive through a belt with pulley connections between a drive shaft and a driven shaft and wherein the belt will be maintained at all times in a straight line to minimize wear thereon.

Another object of the invention is to provide a variable speed belt drive having associated clutch means for releasing the belt to permit the drive shaft to revolve relatively to its driven shaft.

A further object of the invention is to provide a device of the aforedescribed character of extremely simple construction which is capable of being economically manufactured and readily installed between a drive shaft and its parallel driven shaft to enable the speed of rotation of the driven shaft to be manually adjusted and varied relatively to the rotational speed of the drive shaft.

Various other objects and advantages of the invention will hereinafter become more fully apparent from the following description of the drawings, illustrating presently preferred embodiments thereof, and wherein:

Figure 1 is a plan view of a preferred form of the variable speed drive and clutch;

Figure 2 is a longitudinal sectional view thereof taken substantially along a plane as indicated by the line 2—2 of Figure 1;

Figure 3 is a cross sectional view thereof taken substantially along a plane as indicated by the line 3—3 of Figure 1;

Figure 3a is a sectional view taken substantially along a plane as indicated by the line 3a—3a of Figure 1;

Figure 4 is a plan view of another embodiment of the invention;

Figure 5 is a cross sectional view thereof taken substantially along a plane as indicated by the line 5—5 of Figure 4, and Figure 6 is a fragmentary perspective view of the pulley actuating means, shown on an enlarged scale.

Referring more specifically to the drawings, first with reference to the embodiment of the invention as illustrated in Figures 1, 2 and 3, the novel variable speed drive and clutch designated generally 7 and disclosed therein includes a frame, designated generally 8, having corresponding parallel side members 9 and 10. A bearing 11 is secured on the upper surface of side member 10 by fastenings 12 adjacent one end of the frame 8 to provide a journal for a portion of a drive shaft 13 which is journaled therein and disposed transversely over the frame 8, as best illustrated in Figure 3. The drive shaft 13 may be connected to and driven by any suitable power source, not shown. A similar bearing 14 is mounted in the same manner on the upper side of the frame side member 9 adjacent the opposite end of the frame 8 for journaling a portion of a driven shaft 15 which is likewise disposed above and transversely of the frame 8, as seen in Figure 2.

A V-shaped belt pulley, designated generally 16 is mounted on the shaft 13 over the opening of the frame 8 and a corresponding belt pulley, designated generally 17 is similarly located on the driven shaft 15. The belt pulley 16 includes a cone-shaped disk 18 having a hub 19 provided with a fastening 20 for fixedly securing it to the drive shaft 13 and with the hub 19 located adjacent the bearing 11. The belt pulley 16 also includes a complementary cone-shaped disk 21 having a hub portion 22 extending outwardly therefrom and which is splined at 23 on the shaft 13, as seen in Figure 3. A collar 24 is rotatably mounted on the hub 22 and is retained thereon by a retaining collar 25 which is detachably secured around the outer end of the hub 22 by a screw fastening 26.

The belt pulley 17 corresponds to the belt pulley 16 including a stationary cone-shaped disk 18a having a hub 19a secured by fastening 20a to the driven shaft 15 and which is disposed inwardly of and adjacent the bearing 14 and a slidably mounted cone-shaped disk 21a having a hub 22a which is splined as seen at 23a to the shaft 15 and which carries a rotatable collar 24a thereon which is held in place by a retaining collar 25a which is detachably fastened to the hub 22a by a screw fastening 26a. It will thus be readily apparent that the pulley halves 21 and 21a while splined to the shafts 13 and 15, respectively, are capable of sliding toward and away from the stationary pulley halves 18 and 18a, respectively.

A supporting member 27 is secured by fastenings 28 to the upper side of the frame side 9 and extends outwardly therefrom and has a bar 29 secured thereto by fastenings 30. The bar 29 extends transversely over the frame 8 to provide a support and guide for a sleeve 31 which is reciprocally mounted thereon. A lever 32 is pivotally mounted at 33 on the upper side of the support 27 adjacent its outer end and said lever is disposed in a plane substantially parallel to the plane of the support 27 and is mounted for swinging movement on its pivot 33 toward and away from the frame 8. A rigid link 34 is pivotally connected at one end thereof at 35 to the lever 32 adjacent its pivot 33 and is pivotally connected at its opposite end at 36 to the adjacent end of the sleeve or slide 31. The lever 32 is provided with a conventional reciprocating latch 37 for selectively engaging between the teeth or notches of a latch segment 38 which is mounted on the support 27 for releaseably holding the lever 32 in a plurality of adjusted positions.

A pulley actuating lever, designated generally 39 includes an intermediate portion 40, as best seen in Figure 2, composed of spaced substantially parallel sections which loosely straddle the sleeve or slide 31 and which are provided with aligned openings for loosely receiving studs 41 which project from opposite sides of the slide 31 for pivotally connecting said lever 39 to the slide. The lever 39 is provided with complementary fork-shaped ends 42 and 43 and has a shank portion 44 connecting the fork 42 to one end of the intermediate portion 40 and a shank portion 45 connecting the fork 43 to the other end of the intermediate portion 40. Said shank portions are formed of sections rigidly connected together by a plurality of headed fastenings 46 and 47, respectively. As seen in Figure 1, the complementary shank portions and forks are disposed in alignment and in parallel relationship and the intermediate lever portion 40 is disposed obliquely thereto.

Each of the furcations or arms of the forks 42 and 43 has a channel-shaped member 48 secured thereto provided with an inwardly projecting pin 49 which swivelly engages a recess 50 of either the collar 24 or 24a for swivelly connecting the fork 42 to the collar 24 and the fork 43 to the collar 24a. A contractile coiled spring 51 has one end anchored to a bracket 52 which is secured to the shank 44 by one of its fastenings 46 and is attached at its opposite end to an eye screw 53 the shank of which extends slidably through a bracket 54 which projects from the end of the sleeve 31, remote to the end thereof which is connected to the link 34. A nut 55 engages the eye screw 53 and bears against the bracket 54 for varying the tension on the spring 51 which urges the lever 39 to swing in a clockwise direction on its pivot 41, as seen in Figure 1.

A lever 56 is pivotally mounted at one of its ends on the pivot 35 of the link 34 and adjacent said end is pivotally connected at 57 to one end of a rigid link 58, the opposite end of which is pivotally connected to one of the fastenings 46.

An endless belt 59 of a substantially V-shaped cross section is trained over the belt pulleys 16 and 17. Assuming that the parts are in the positions as illustrated in Figure 1 and that the drive shaft 13 is revolving at a constant speed, since the pulley sections 18 and 21 are disposed in adjacent positions the belt 59 will engage the outer part of the pulley 16 to be driven thereby. However, the belt pulley section 21a is spaced from the belt pulley section 18a so that the belt 59 will engage the inner portion of the pulley 17 and accordingly will cause the pulley 17 and driven shaft 15 to be revolved at a faster rate than the drive shaft 13. By releasing the latch 37 and swinging the lever 32 in a direction away from the frame 8 the slide 31 will be drawn from right to left of Figure 1 causing the lever 39 to slide in the same direction so that the pulley section 21 will be displaced away from the pulley section 18 and the pulley section 21a will be displaced toward the pulley section 18a thereby causing the belt 59 to move inwardly on the pulley 16 and outwardly toward the periphery of the pulley 17 so that the pulley 17 will then be driven at a slower speed than the pulley 16 and the driven shaft 15 will accordingly revolve at a lesser rate than the drive shaft 13. Likewise, the pulleys 16 and 17 could be disposed in corresponding positions so that both shafts and pulleys would be revolved at the same speed.

It will also be noted that the side edges of the belt 59 will remain parallel to the frame sides 9 and 10 irrespective of the position of the belt pulleys 16 and 17, as previously described, so that the belt will not be displaced out of a straight line by movement of the belt pulley which is very important since otherwise the belt would be subjected to excessive wear.

The spring 51 constitutes a part of a clutch structure to normally retain the pulley sections 21 and 21a in engaged positions by urging the lever 39 to rock clockwise as seen in Figure 1 for thereby urging said movable pulley sections toward the stationary pulley sections 18 and 18a, respectively. However, by swinging the lever 56 away from the frame 8 on the pivot 35 a pull will be exerted thereby on the link 58 to cause the lever 39 to rock counterclockwise as seen in Figure 1 on its pivot 41 against the action of the spring 51 for simultaneously displacing both sliding pulley halves away from the stationary pulley halves for releasing the belt 59 so that the drive shaft 13 can revolve relatively to the belt and to the driven shaft 15 to thus provide a clutch in combination with the speed changing structure.

Figures 4, 5 and 6 illustrate a simplified embodiment of the invention and wherein the belt is displaced out of parallelism with the frame sides when one belt pulley is spread and the other belt pulley is closed and which may be utilized satisfactorily where the belt is relatively narrow and not much power is required to revolve the driven shaft. In this form of the invention a frame 60 is shown having an end of a drive shaft 61 extending transversely through and journaled in its side wall 62 adjacent one end thereof and an end of a drive shaft 63 similarly disposed adjacent the opposite end of the frame and likewise journaled in the wall 62. The drive shaft 61 carries a belt pulley, designated generally 64 corresponding to the belt pulley 16 in construction and wherein the stationary pulley half is disposed adjacent the frame side 62. A belt pulley, designated generally 65 is mounted in the frame 60 on the driven shaft 63 and corresponds with the belt pulleys 16 and 17 in construction. However, whereas the slidably splined pulley halves 21 and 21a are oppositely disposed, as seen in Figure 1, the slidably splined pulley halves 66 and 67 of the belt pulleys 64 and 65, respectively, are disposed adjacent corresponding ends of the shafts 61 and 63.

A guide bar 68 is secured by a fastening 69 in a boss 70 of the frame side 62 and extends transversely through the frame to adjacent its opposite side and provides a support and guide for reciprocally receiving a sleeve or slide 71 which is urged toward the side 62 by an expansion spring 72 which is carried by the guide 68 and bears with one end against the slide 71 and has its opposite end seating against a collar 73.

A lever, designated generally 74 and formed of corresponding sections is provided with a substantially circular intermediate portion 75 which engages loosely around the slide 71 and is pivotally connected thereto by headed studs 76. The lever 74 is provided with complementary end portions which project obliquely from said intermediate portion 75 and each of which includes a shank portion 76 having an outer end terminating in a fork 77. The legs of one fork 77 are pivotally connected to the pulley half 66 and the legs of the other fork 77 are pivotally connected to the pulley half 67. The connection of the fork legs to the pulley halves is identical with that disclosed in Figures 1 to 3 and a further description thereof is therefore considered unnecessary.

A lever, designated generally 78 which is substantially Y-shaped has the terminal portions of its complementary legs 79 downwardly offset and connected to the two lever shank portions 76 each by a fastening 80 and with the shank portion 81 and the adjacent ends of the legs 79 being upwardly offset and positioned above the spring 72 and collar 73. A rigid link 82 is pivotally connected at one end to the shank 81 and is pivotally connected at its opposite end to one end of a lever 84 which is pivotally mounted intermediate of its ends at 85 on a latch segment 86 which is secured on the frame 60 and which cooperates with a reciprocating latch 87 carried by the opposite end portion of the lever 84 to retain said lever 84 and lever 81 in a plurality of adjusted positions.

A lever 88 is pivotally mounted at 89 intermediate of its ends on the frame side 62 and is pivotally onnected at one end thereof to an end of a push rod 90, the opposite end of which is looped as seen at 91 to engage slidably about the bar 68 for bearing against the opposite, inner end of the slide 71 so that when the lever 88 is swung counterclockwise on its pivot 89, as seen in Figure 4, the push rod 90 will be actuated for displacing the slide 71 and lever 74 in a direction from left to right of Figure 4 for moving both sliding pulley halves away from the stationary pulley halves for disengaging the belt 92, which is trained over the pulleys 64 and 65, so that the drive shaft 61 can be revolved without driving the driven shaft 63 and belt 92. The spring 72 will normally urge the slide 71 in the opposite direction for urging the sliding pulley halves toward the stationary pulley halves for holding both pulleys in tight engagement with the belt 92.

Likewise, by swinging the lever 84 counterclockwise on its pivot 85 the lever 74 will be rocked counterclockwise on its pivot 76 through the link and lever connection 82 and 78, respectively, for displacing the pulley half 66 inwardly and for displacing the other pulley half 67 outwardly, each relatively to its complementary stationary pulley section, for the same purpose as previously described with reference to the variable speed drive 7 and so that the driven shaft 63 may be revolved either at the same speed, faster or slower than the drive shaft 61.

Various other modifications and changes are likewise contemplated and may obviously be resorted to, without departing from the spirit or scope of the invention as hereinafter defined by the appended claims.

I claim as my invention:

1. A variable speed drive comprising a frame, parallel shafts journaled on the frame including a drive shaft and a driven shaft, a belt pulley connected to each shaft for rotation therewith, each belt pulley including a fixedly mounted cone-shaped disk forming one pulley section and a movable cone-shaped disk section slidably splined to the shaft, a support mounted on said frame extending substantially parallel to the shafts, a slide reciprocably mounted on said support, a belt pulley actuating lever pivotally connected intermediate of its ends to said slide and pivotally and rotatably connected at its ends to the slidably mounted belt pulley sections, a first manually actuated link and lever means connected to the slide for moving the slide and the intermediate lever portion relatively to the frame in opposite directions parallel to the shafts for displacing one slidable belt pulley section away from its stationary belt pulley section and for simultaneously moving the other slidable belt pulley section toward the other stationary belt pulley section for varying the effective diameters of said belt pulleys, and spring means adjustably anchored to the slide and connected to the belt pulley actuating lever at a point spaced from its intermediate pivotally mounted portion for rocking said lever on the slide in a direction for urging both slidable belt pulley sections toward the stationary belt pulley sections.

2. A variable speed drive as in claim 1, and a second manually actuated link and lever means pivotally connected to the belt pulley actuating lever adjacent one end thereof for rocking said lever in the opposite direction and against the action of said spring means for simultaneously moving both slidable belt pulley sections away from the stationary belt pulley sections.

ALF A. PETERSON.

REFERENCES CITED

The following references are of record in the file of this patent:

UNITED STATES PATENTS

| Number | Name | Date |
|---|---|---|
| 1,792,215 | Everroad | Feb. 10, 1931 |
| 1,963,807 | Reeves | June 19, 1934 |
| 2,076,926 | Timmermann | Apr. 13, 1937 |
| 2,109,247 | Clay | Feb. 22, 1938 |
| 2,347,479 | Higgins | Apr. 25, 1944 |
| 2,532,762 | Deletaille | Dec. 5, 1950 |

FOREIGN PATENTS

| Number | Country | Date |
|---|---|---|
| 72,542 | Switzerland | June 2, 1916 |
| 368,050 | Great Britain | Mar. 3, 1932 |